United States Patent
Grogan

[19]

[11] Patent Number: 5,865,498
[45] Date of Patent: Feb. 2, 1999

[54] DRAIN TROUGH FOR A RECREATIONAL VEHICLE

[76] Inventor: Michael K. Grogan, 2A Charles St., Pawling, N.Y. 12564

[21] Appl. No.: 828,385

[22] Filed: Mar. 28, 1997

Related U.S. Application Data

[60] Provisional application No. 60/015,545, Apr. 16, 1996.

[51] Int. Cl.$^6$ .................................................. B60R 15/00
[52] U.S. Cl. ......................... 296/163; 296/208; 296/163; 52/11
[58] Field of Search .................................... 296/208, 163; 52/11

[56] References Cited

U.S. PATENT DOCUMENTS

| | | |
|---|---|---|
| 2,635,918 | 4/1953 | Muckle . |
| 2,930,652 | 3/1960 | Bidlingmaier et al. . |
| 3,334,454 | 8/1967 | Abrams ........................................ 52/11 |
| 4,257,716 | 3/1981 | Woodrow ..................................... 52/11 |
| 4,332,415 | 6/1982 | Williams . |
| 4,553,356 | 11/1985 | Pepper ........................................ 52/11 |
| 4,622,785 | 11/1986 | Miller ......................................... 52/11 |
| 4,634,172 | 1/1987 | Duda ....................................... 296/163 |
| 5,342,107 | 8/1994 | Saji et al. . |
| 5,437,138 | 8/1995 | Touhey et al. ............................... 52/11 |

FOREIGN PATENT DOCUMENTS

| | | |
|---|---|---|
| 3124-271 | 6/1983 | Germany . |
| 3150-027 | 6/1983 | Germany . |
| 4-76831 | 10/1993 | Japan . |
| 405263508 | 10/1993 | Japan ......................................... 52/11 |

*Primary Examiner*—D. Glenn Dayoan
*Assistant Examiner*—Kiran Patel
*Attorney, Agent, or Firm*—Richard C. Litman

[57] ABSTRACT

A drain trough for recreational vehicles includes a base with two side walls upwardly extending therefrom to define a drain channel for receiving rain water and solid debris. The drain trough is slidably engageable with an existing awning track protruding from a wall of a recreational vehicle via a suspension rod. The suspension rod laterally extends from a top of one of the side walls of the drain trough. This same side wall has a support foot laterally extending proximate the base. The combination of the suspension rod and support foot dispose the drain trough in an upright, functional attitude in order to prevent damage to the vehicle by dripping and accumulating rainwater and debris. The drain trough optionally includes a splice for interconnecting two drain trough sections together, as well as an end cap for preventing rain and debris from exiting one end of the drain trough.

9 Claims, 3 Drawing Sheets

DRAIN TROUGH FOR A RECREATIONAL VEHICLE

CROSS-REFERENCE TO RELATED APPLICATION

This application claims the benefit of U.S. Provisional Patent Application Ser. No. 60/015,545, filed Apr. 16, 1996.

BACKGROUND OF THE INVENTION

1. Field of the Invention

The present invention relates to drain devices and more particularly to drain troughs for recreational vehicles.

2. Description of Prior Art

Due to the evolution of vehicles, most vehicles have roofs and sidewalls with some type of drainage system. Over the years, the desire to protect oneself from external elements has inspired the creation of permanent, removable, and even convertible rooftops to be placed onto the bodies of vehicles. In time, however, the lack of a proper drainage system in the rooftop caused damage to the vehicle. As such, drain devices fitted onto the rooftops and sidewalls of the vehicle were developed to ameliorate this damage. Trim moldings were later developed to be fitted inside the drain device in order to add a decorative appearance to the drain device, and if necessary, to incorporate a functional attribute of drainage.

If it so happens that a vehicle does not come equipped with a drainage system, as may be the case with some convertible vehicles and almost all recreational vehicles such as campers, the typical way in which most persons fit drain devices onto their vehicle is by some type of mechanical fastener. However, mechanical fasteners usually require a hole to be drilled into the body of the vehicle, and this usually requires one to purchase an expensive drill or the like. Furthermore, drilling holes and attaching mechanical fasteners to the body of the vehicle usually involve permanently marring the vehicle's body. Examples of this prior art include U.S. Pat. No. 2,635,918 issued Apr. 21, 1953, to Muckle; and U.S. Pat. No. 4,332,415 issued Jun. 1, 1982, to Williams. Muckle discloses a combination rain shield and drain device for use with a convertible automobile to protect against damage when the vehicle is moving and the windows are open. In order to use the rain shield and drain device, an attachment having latching pins and holes must be installed into the body, assuming the car did not already have these items incorporated during manufacture. Williams discloses an improved cover for a golf cart having a drain device attached to the periphery of its roof by a mechanical fastener, such as a nut and bolt, rivet, or the like.

Even where the vehicle comes equipped with some type of drainage system, these systems are usually designed with trim moldings in order to enhance the decorative appeal of the automobile. Many of these trim moldings are fitted to the existing drainage system by fastening mechanisms, such as studs, which have a tendency to increase cost, as well as involve time and energy for the installation thereof. Examples of such prior art include German Patent No. 3,150,027 issued Jun. 23, 1983, to Volkswagenwerk AG; and Japanese Application No. 4-76831 published Oct. 26, 1993, by Iwamura. Volkswagenwerk AGS discloses an elastic trim strip which fits into the side gutter of a vehicle and extends over the gutter lip. The strip is a hollow profiled section which extends along the vehicle to a rail having turned over lips which clip onto studs, or screw members, secured into the bed of the gutter. Iwamura discloses a weather strip having a groove coupled to a retainer by double-coated tape, wherein the retainer is clamped to a side rail by a screw and a positioning head is integrated into the screw.

Attempts have been made to install these trim moldings without studs and the drilling of holes or the like. However, these attempts usually involve using at least two pieces which function together to hold the molding to the drainage system, wherein at least one of these pieces is made of an elastomeric material such as rubber which deteriorates rather quickly when continuously exposed to external elements. Examples of such prior art include: U.S. Pat. No. 2,930,652 issued Mar. 29, 1960, to Bidlingmaier et al.; and U.S. Pat. No. 5,342,107 issued Aug. 30, 1994, to Saji et al.; and German Patent No. 3,124,271 issued Jan. 5, 1983, to Gebr. Happich GmbH. Bidlingmaier et al. discloses a decorative rail molding and retainer clip combination for an automotive drip trough. The molding seats directly into the trough and is held into place by the retainer clip. The combination is constructed of a spring material such as stainless steel. Saji et al. discloses a vehicular roof drip molding having a U-shaped clamp portion mounted onto a flange portion of a side body of an automobile. The molding is a double-walled structure which is manufactured by extruding a hard elastomeric material over an interior soft core. Gebr. Happich GmbH discloses a two-piece decorative molding for the roof edge of an automobile having a rain gutter. The first piece is a plastic support member which lays on the top of the second piece. The second piece snaps onto the top of the rain gutter and has a saw tooth ridge member for gripping.

With respect to recreational vehicle campers, these types of vehicles usually have an awning mounted onto an awning track. Due to the combination of the awning and the awning track, however, one is prevented from installing a drainage device having mechanical fasteners. Since this type of drainage device is the norm, the presence of the awning track and the awning therefore teaches away from installing a drainage device onto a recreational vehicle camper. This can be evidenced by the fact that the walls of recreational vehicle campers have unattractive black streaks caused by unimpeded rain and/or solid matter running therealong.

None of the above inventions and patents, taken either singly or in combination, is seen to describe the instant invention as claimed. Thus a drain trough for a recreational vehicle solving the aforementioned problems is desired.

SUMMARY OF THE INVENTION

The instant invention includes a drain trough or gutter assembly for use with a recreational vehicle which has an awning track having a receiving portion with a predetermined radius. The awning track protrudes from a wall of the vehicle having at least one window and a respective window casement. The drain trough includes a base and two side walls vertically extending from the base to define a drain channel. Each of the side walls has a top and an opposing bottom. A suspension rod horizontally extends from a top of one side wall, wherein the rod is configured for slidable engagement with the existing awning track. An elongate support foot horizontally extends at the bottom of the same side wall from which the rod protrudes. The foot contacts the vehicle wall to support the drain channel in an upright attitude. The drain channel receives liquid and solid debris in order to prevent damage to the vehicle wall and window casement.

Accordingly, it is a principal object of the invention to provide a drain trough which can be easily installed on a recreational vehicle for preventing unsightly black streaks on the vehicle exterior wall caused by dripping rainwater.

It is another object of the invention to provide a drain trough which can be installed on a recreational vehicle having an existing awning track without modifying or altering the vehicle.

It is a further object of the invention to provide a drain trough which can be easily installed on a recreational vehicle in order to prevent dampness and rotting of the window casements of the vehicle caused by dripping rainwater.

It is a further object of the invention to be able to install a drain trough on a recreational vehicle without any need to purchase expensive tools for the drilling of holes into the side of the vehicle.

Still another object of the invention is to be able to install a drain trough on a recreational vehicle without any need to purchase screws or other items for mounting the drain trough onto the vehicle.

It is a further object of the invention to provide a recreational vehicle drain trough or gutter assembly of uncomplicated construction which may be easily fabricated of extruded aluminum or similar materials, or plastic materials such as vinyl, PVC, etc.

It is an object of the invention to provide improved elements and arrangements thereof in a drain trough for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
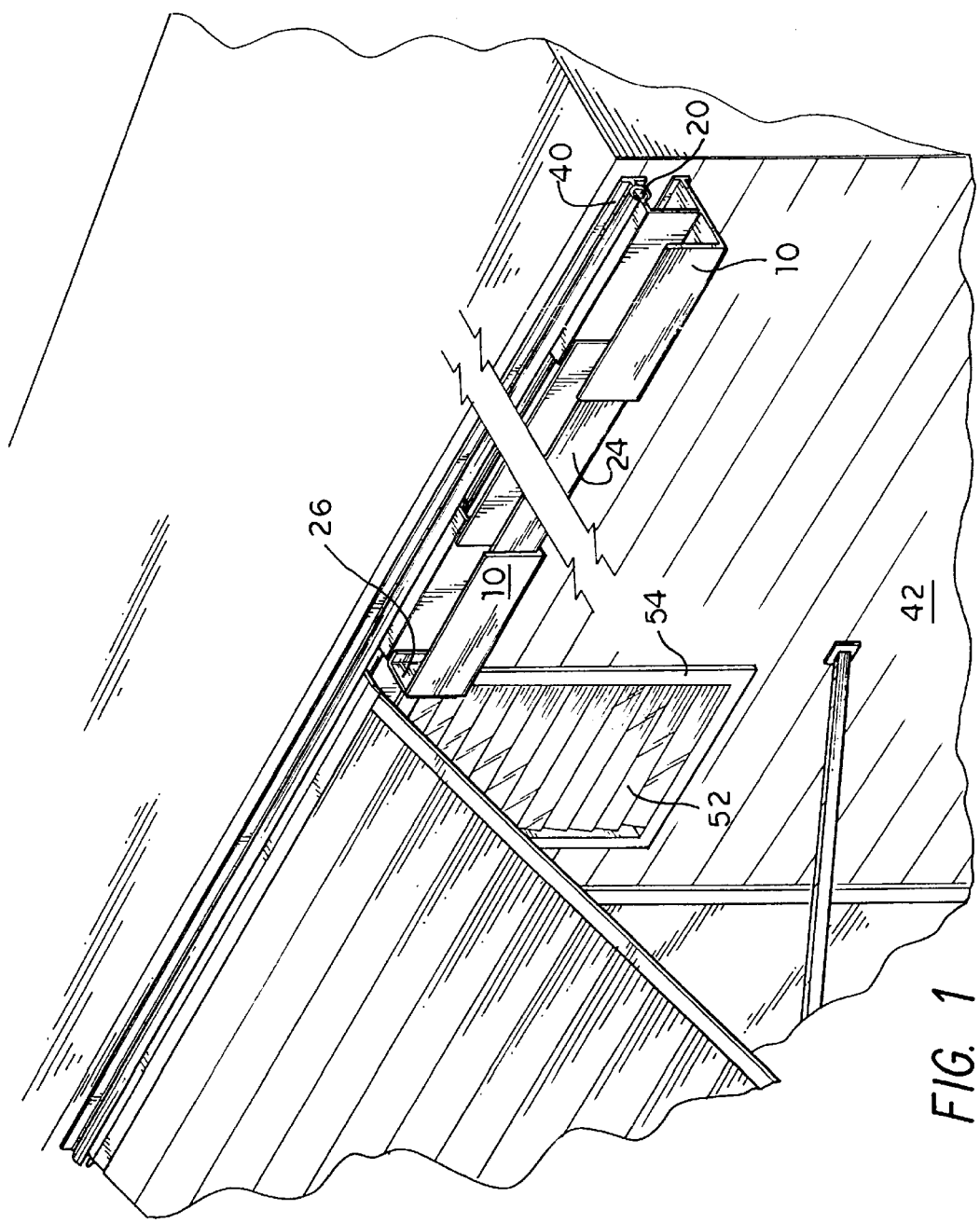
FIG. 1 is an environmental, perspective view of the drain trough for a recreational vehicle according to the present invention.

As depicted in FIG. 1, the instant invention includes a drain trough 10 for recreational vehicles having an existing awning track 40 protruding from a wall 42 of the vehicle. The vehicle wall 42 has at least one window 52 with its respective window casement 54, while the awning track 40 has a receiving portion 56 with a predetermined radius 58 (best seen in FIG. 3).

Figure 3:
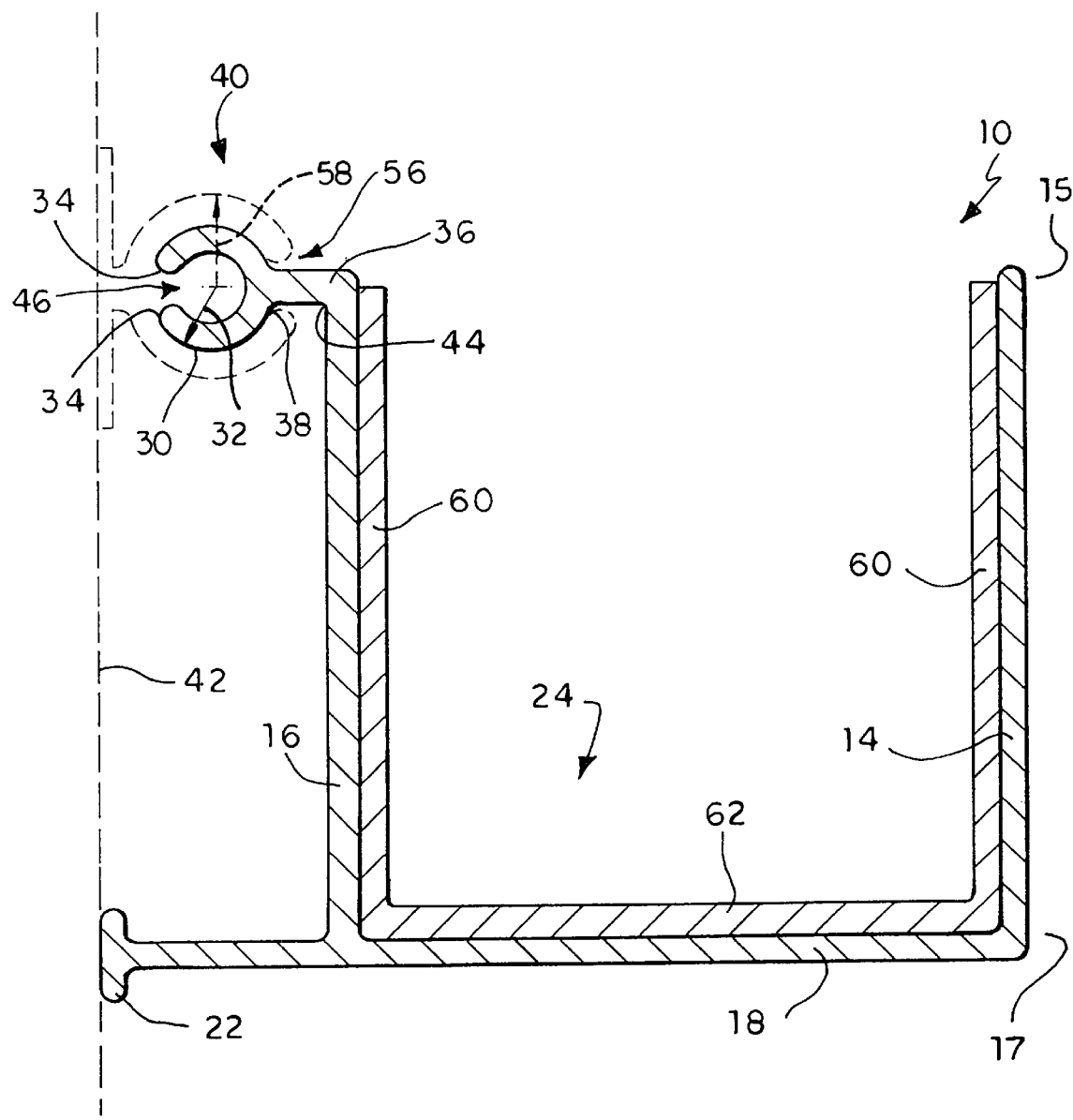
FIG. 3 is a side view of the drain trough as seen in FIG. 1.

As best depicted in FIG. 3, the drain trough 10 includes a base 18 and two side walls 14, 16, vertically extending from the base 18 to define a drain channel 12. Each of the side walls 14, 16 has a top 15 and an opposing bottom 17. A suspension rod 20 horizontally extends from the top 15 of side wall 16, wherein the rod 20 is configured for slidable engagement with the existing awning track 40. An elongate support foot horizontally extends at the bottom of side wall 16 proximate base 18, in such a manner that the drain trough 10 is mounted in a functional, upright attitude. The drain trough 10 optionally includes at least one splice 24 for interconnecting sections of the drain trough 10 together, as well as an end cap 26 for preventing rain and debris from exiting one end of the drain trough 10.

Figure 2:
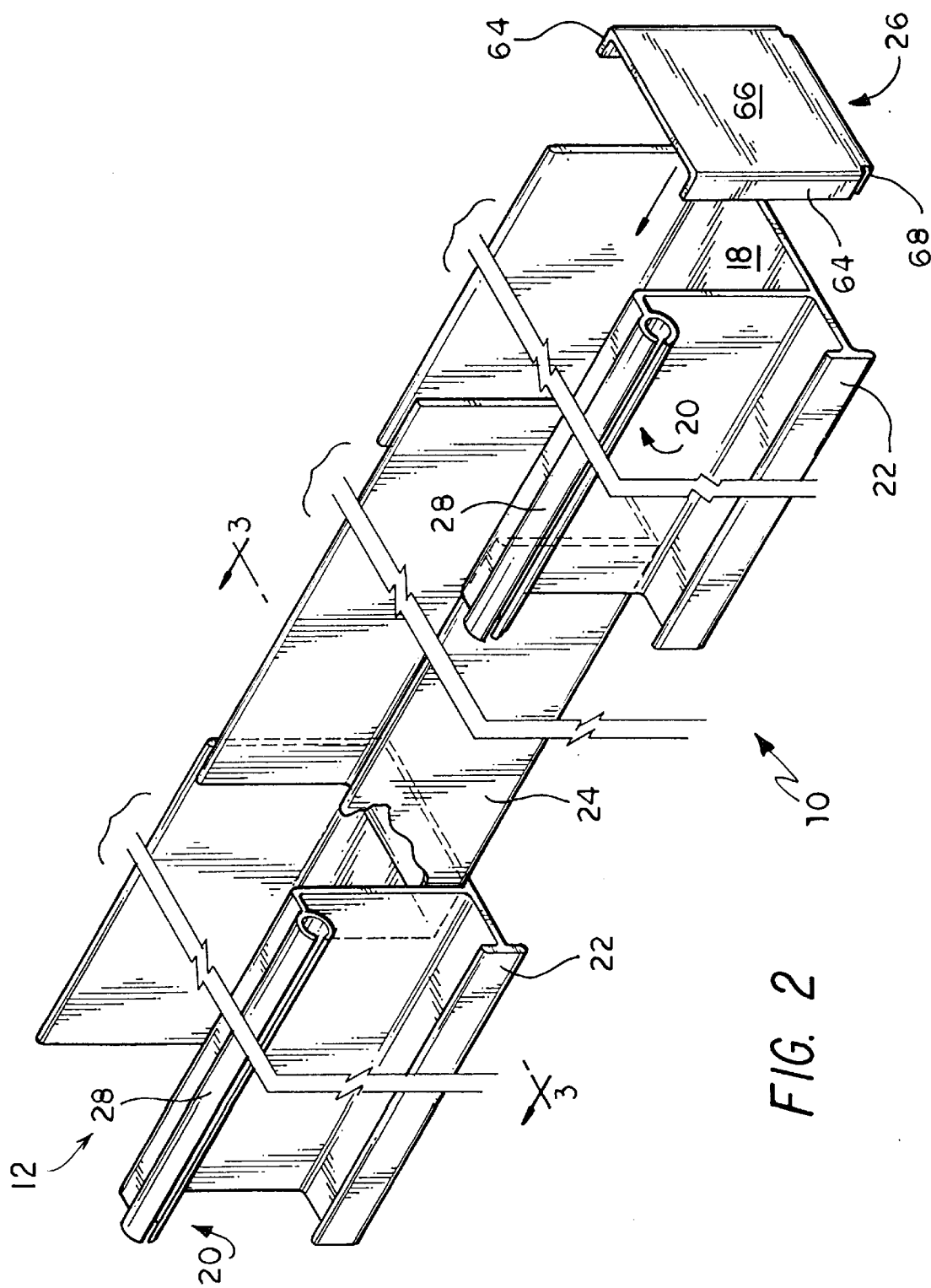
FIG. 2 is a perspective, partially exploded view of the drain trough shown in FIG. 1.

As can be seen in FIGS. 2–3, the suspension rod 20 includes an incomplete, split sleeve 28 having an outer perimeter 30 and an outer radius 32. The sleeve 28 is defined by a pair of identical fingers 34 integrated into an arm 36 having a first and second end 38, 44. The arm 36 connects together the fingers 34 at the first end 38, while being attached to side wall 16 at its second end 44. The sleeve 28 has an opening 46 in the outer perimeter 30 which is opposite the first end 38 where the fingers 34 are connected together. The outer radius 32 is less than the predetermined radius 58 of the awning track 40 such that the suspension rod 20 may be slid into the receiving portion 56 of the awning track 40 and engaged thereby.

As can be seen in FIGS. 2 and 3, splice 24 has a rectangular shape defined by two side walls 60 and an interconnecting bottom wall 62. As can be seen in FIG. 2, end cap 26 has two side walls 64, a bottom wall 68, and a retaining wall 66.

In the preferred embodiment, the drain trough 10, the splice 24, and the end cap 26 are made by extruding an aluminum alloy, such as 6063-T5, having a mill finish, in sheet form with a thickness of approximately 0.062". Once extruded, the drain trough 10, the splice 24, and the end cap 26 are placed in a vat with clear anodize in order to effect an electrostatically plated, clear anodized coating. Placing a clear anodized coating onto aluminum helps prevent corrosive pitting of the aluminum, thereby prolonging the life of the metal. This electrostatic process involving clear anodize is well-known in the art.

In constructing the end cap 26, once a flat aluminum piece is extruded and coated with clear anodize, the corners of one end are sheared and bent. The retaining wall 66 and bottom wall 68 are then formed by bending this flat aluminum piece twice along its sheared corners.

The dimensions of base 18 are approximately 1.500" high, 1.500" wide, and 8' long. The suspension rod 20 has an outer radius 32 of approximately 0.140" and an opening 46 of 0.031". The distance between the center of suspension rod 20 and side wall 16 is approximately 0.255". The distance between support foot 22 and side wall 16 is approximately 0.619". The height of support foot 22 is approximately 0.200".

Manufacturing suspension rod 20 with sleeve 28 having an outer radius 32 helps reduce the quantity of aluminum needed, thereby reducing the already inexpensive cost to manufacture the drain trough 10. In a similar manner, support foot 22 need not be extruded entirely as one length running the entire distance of a section of the drain trough 10, but rather as a broken section such that less aluminum is needed in order to manufacture the durable metal drain trough 10. Furthermore, a rubber or vinyl protective pad (not shown) may be attached to the end of foot 22 by frictional means or glue. The purpose of the protective pad is to protect the finish of vehicle wall 42.

With respect to splice 24, the dimensions are approximately 1.376"+0.000"/–0.010" wide, 1.380"+/–0.025" high, and 2.000" long. With respect to end cap 26, the dimensions are approximately 1.376"+0.000"/–0.010" wide and 1.407"+/–0.020" high.

In operation, a user of the drain trough 10 for a recreational vehicle camper need simply insert one section of the drain trough 10 into the awning track 40 by slidably engaging the drain trough's suspension rod 20 into the awning track's receiving portion 56. The user then allows the support foot 22 to rest against the side 42 of the vehicle such that the drain trough 10 is firmly supported in a functional, upright attitude, ready to receive any liquid and solid debris.

Since each section is 8' long, the user may need to have more than one 8' section in order to prevent the undesirable black streaks caused by unimpeded water and solids running down vehicle wall 42. If more than one 8' section is required, all the user need do is simply insert one half of splice 24 into one section of the drain trough 10 and the other half of splice 24 into another section for securely engaging the two sections together. If a length shorter than 8' is required, the user may simply shear a section in order to achieve the desired length.

Having properly mounted the drain trough 10 onto the vehicle, the user should then insert end cap 26 into the drain channel 12 at the end of the drain trough 10 proximate the awning. In order to secure end cap 26 in place, the user should place a quick-setting silicone material or the like onto side and bottom walls 64, 68 of the end cap 26 before sliding it into the drain channel 12. The end cap 26 allows liquid and solid matter which has accumulated in the drain trough 10 to freely flow out the drain trough 10 without damaging the awning.

It is to be understood that the present invention is not limited to the embodiments described above, but encompasses any and all embodiments within the scope of the following claims.

I claim:

1. A drain trough for a recreational vehicle having an awning track, said drain trough comprising:

a base;

a first side wall and an opposing side wall vertically extending from said base to define a drain channel, each said side wall having a top and an opposing bottom, said bottom being proximate said base;

a suspension rod horizontally extending from said first wall at said top for slidably mounting onto an awning track of a recreational vehicle, said suspension rod including a pair of fingers and a hand having a first and second opposing end, said hand connecting said fingers together at said first end, said hand connecting said suspension rod to said first side wall at said second end; and a support foot horizontally extending from said first wall at said bottom, whereby liquid and solid debris can be received within said drain channel.

2. The drain trough for a recreational vehicle according to claim 1, further comprising a U-shaped splice being inserted into said drain channel for connecting two drain channels together.

3. The drain trough for a recreational vehicle according to claim 2, wherein said splice is made of an extruded aluminum alloy having a clear anodized coating.

4. The drain trough for a recreational vehicle according to claim 1 further comprising an end cap.

5. The drain trough for a recreational vehicle according to claim 4, wherein said end cap is made of an extruded aluminum alloy having a clear anodized coating.

6. The drain trough for a recreational vehicle according to claim 1, wherein each said side wall and said base are made of an extruded aluminum alloy.

7. The drain trough for a recreational vehicle according to claim 6, wherein each said side wall and said base have a clear anodized coating.

8. A gutter in combination with an awning track horizontally extending from a wall of a recreational vehicle camper, said wall having at least one window and respective window casement, said awning track having a receiving portion with a predetermined radius, said gutter comprising:

a base;

a first side wall and an opposing side wall vertically extending from said base to define a drain channel, each said side wall having a top and an opposing bottom, said bottom being proximate said base;

a suspension rod horizontally extending from said first wall at said top for slidably mounting onto an awning track of a recreational vehicle, said suspension rod including a pair of fingers and a hand connecting said fingers together to define an incomplete sleeve, said sleeve having an outer perimeter, an outer radius, and an opening in said outer perimeter, said outer radius being less than said predetermined radius of said awning track such that said suspension rod may be slid into said receiving portion of said awning track and engaged thereby; and a support foot horizontally extending from said first wall at said bottom, whereby liquid and solid debris can be received within said drain channel.

9. The gutter for a recreational vehicle according to claim 8, further comprising an end cap and a splice, said splice and said end cap being dimensioned and configured to slidably engage said drain channel.

* * * * *